United States Patent
Kent et al.

(10) Patent No.: US 10,516,291 B2
(45) Date of Patent: Dec. 24, 2019

(54) DONGLE HAVING RECHARGEABLE, SUPERCAPACITOR BASED POWER SUPPLY

(71) Applicant: AVOCENT HUNTSVILLE, LLC, Huntsville, AL (US)

(72) Inventors: Phillip R. Kent, Monroe, WA (US); Karl S. Mills, Lynnwood, WA (US)

(73) Assignee: VERTIV IT SYSTEMS, INC., Huntsville, AL (US)

(*) Notice: Subject to any disclaimer, the term of this patent is extended or adjusted under 35 U.S.C. 154(b) by 93 days.

(21) Appl. No.: 15/678,902

(22) Filed: Aug. 16, 2017

(65) Prior Publication Data
US 2018/0316211 A1    Nov. 1, 2018

Related U.S. Application Data

(60) Provisional application No. 62/490,271, filed on Apr. 26, 2017.

(51) Int. Cl.
*H02J 7/34*    (2006.01)
*G06F 1/26*    (2006.01)
(Continued)

(52) U.S. Cl.
CPC .............. *H02J 7/345* (2013.01); *G06F 1/263* (2013.01); *G06F 1/266* (2013.01); *G06F 1/28* (2013.01);
(Continued)

(58) Field of Classification Search
CPC ..................................................... H02J 7/345
(Continued)

(56) References Cited

U.S. PATENT DOCUMENTS 6,105,119 A    8/2000    Kerr et al.
6,211,649 B1    4/2001    Matsuda
(Continued)

FOREIGN PATENT DOCUMENTS

CN    1734397 A    2/2006
CN    101515969 A    8/2009
(Continued)

OTHER PUBLICATIONS

Avocent: "Data Center Infrastructure Management (DCIM) White Paper", Internet Citation, Sep. 10, 2010 (Sep. 2010), pp. 1-16, XP002663281, Retrieved from the Internet: URL:http://www.edcosurge.com/en-US/About/Events/Documents/OOW-MediaKit/10_DCIM_Trellis.pdf [retrieved on Nov. 9, 2011].
(Continued)

*Primary Examiner* — Edward Tso
*Assistant Examiner* — Ahmed H Omar
(74) *Attorney, Agent, or Firm* — Harness, Dickey & Pierce, P.L.C.

(57) ABSTRACT

A backup power system is disclosed which has a first port in communication with a server. The server includes first and second ports, and the backup power system is in communication with the second port of the server and receives a first voltage signal from the second port of the server. A second communications port of the system is in communication with a peripheral. The peripheral is powered by a separate connection to the first port of the server. A controller of the system detects when power being provided by the server through the server's second port has dropped below a threshold level. A power storage component responsive to the controller supplies power to the peripheral when the power provided from the server's second port drops below the threshold level.

20 Claims, 2 Drawing Sheets

(51) Int. Cl.
  *H02J 9/06* (2006.01)
  *H02J 7/00* (2006.01)
  *G06F 1/28* (2006.01)
  *G06F 1/30* (2006.01)
  *G08B 5/36* (2006.01)

(52) U.S. Cl.
  CPC ............... *G06F 1/30* (2013.01); *G06F 1/305* (2013.01); *H02J 7/0063* (2013.01); *H02J 9/061* (2013.01); *G08B 5/36* (2013.01)

(58) Field of Classification Search
  USPC .................................................. 320/166, 167
  See application file for complete search history.

(56) References Cited

U.S. PATENT DOCUMENTS

| | | | |
|---|---|---|---|
| 6,298,370 | B1 | 10/2001 | Tang et al. |
| 8,296,587 | B2 | 10/2012 | Paniagua, Jr. et al. |
| 9,069,541 | B2 | 6/2015 | Kent et al. |
| 9,129,069 | B2 | 9/2015 | Lo et al. |
| 2003/0110245 | A1 | 6/2003 | Sanders et al. |
| 2004/0103326 | A1 | 5/2004 | Hirst et al. |
| 2004/0150934 | A1* | 8/2004 | Baarman .................. H01F 5/02 361/115 |
| 2005/0129035 | A1 | 6/2005 | Saito |
| 2006/0036885 | A1 | 2/2006 | Hsieh |
| 2007/0025452 | A1 | 2/2007 | Schindler |
| 2007/0038939 | A1 | 2/2007 | Challen et al. |
| 2008/0098411 | A1 | 4/2008 | Dirstine et al. |
| 2008/0136385 | A1 | 6/2008 | Kent |
| 2008/0203818 | A1 | 8/2008 | Kuo |
| 2008/0253085 | A1 | 10/2008 | Soffer |
| 2009/0082910 | A1 | 3/2009 | Sato |
| 2011/0040901 | A1* | 2/2011 | Khan .................... G06F 13/409 710/10 |
| 2011/0113166 | A1 | 5/2011 | Hung et al. |

FOREIGN PATENT DOCUMENTS

| | | |
|---|---|---|
| WO | 2008021052 A2 | 2/2008 |
| WO | 2009086567 A1 | 7/2009 |

OTHER PUBLICATIONS

International Search Report and Written Opinion for corresponding International Application No. PCT/US2017/049434, dated Jan. 23, 2018, 18 pp.

* cited by examiner

DONGLE HAVING RECHARGEABLE, SUPERCAPACITOR BASED POWER SUPPLY

CROSS REFERENCE TO RELATED APPLICATIONS

The present application claims priority from U.S. Provisional patent application Ser. No. 62/490,271, filed Apr. 26, 2017, the entire contents of which are incorporated by reference into the present disclosure.

FIELD

The present disclosure relates to dongles used with peripherals, for example keyboard, video and mouse ("KVM") appliances, and more particularly to a dongle incorporating a rechargeable supercapacitor for maintaining power to a peripheral during short intervals where power being supplied to the peripheral by a server or other computing device is interrupted.

BACKGROUND

The statements in this section merely provide background information related to the present disclosure and may not constitute prior art.

Most devices/accessories physically connected to a computer/server are powered by the server itself. Such devices often include a communications interface termed a "rack interface pod", which interfaces a keyboard, video and mouse ("KVM") appliance to a communications port, for example a Universal Serial Bus ("USB") port, of a server. The rack interface pod enables both serial communications with the server, as well as the capability to receive video from the server. When the server is power cycled or rebooted, an attached rack interface pod will lose power for a relatively short window of time. The window of time may vary but typically is between a few seconds up to about 45 seconds.

Some types of peripherals that are designed to be powered by a connected computer/server can tolerate a loss of power for a limited window of time, such as mentioned above, without affecting usability of the device. There are, however, use cases where a peripheral that is powered by a computer/server must maintain a level of performance in order to fulfill its purpose and function, and where even a very brief loss of power is not acceptable.

One method for ensuring continuous power to a peripheral device such as a rack interface pod, where its primary power source would be a server to which it is attached, is to provide alternate power from a standard 120V AC power outlet either directly or using an AC to DC power adapter. The problem with this approach is that it utilizes a 120V AC power outlet that can be in high demand in certain applications or environments. This approach also creates a cable management problem in that power must be routed from each 120V AC power outlet to each device. This management issue can be somewhat reduced by supplying multiple devices from a single 120V AC outlet, but each device still needs an AC or DC supply to it originating from the 120V AC outlet.

Another widely used solution to the temporary power loss problem is to provide power to the device through a physical interface such as Power over Ethernet ("PoE") or similar custom solution. The problem with this solution is that devices that implement a PoE-based solution can add a cost burden to other infrastructure if PoE capability is not already present in the data center environment. Even if PoE is present in the data center environment, there will be an added cost burden in configuring the device to support the PoE-based solution.

SUMMARY

In one aspect the present disclosure relates to a backup power system. The system may comprise a first port in communication with a server, with the server including first and second ports. The backup power system may be in communication with the second port of the server and may receive power from the second port of the server. The server's first and second ports put out the same power output. A second communications port may be in communication with a peripheral. The peripheral may be powered by a separate connection to the first port of the server. The system may further include a controller for detecting when power being provided by the server through the power from the server's second port has dropped below a threshold level. The system may further include a power storage component responsive to the controller for supplying power to the peripheral when the power being provided from the server's second port drops below the threshold level.

In another aspect the present disclosure relates to a backup power system adapted to be coupled in communication with a second universal serial bus (USB) port of a server and a port of a peripheral. The peripheral also has a first USB port coupled to a first USB port of the server. The system may comprise a controller and a voltage measurement subsystem for monitoring power received from the second USB port of the server. The system may further include a power storage component and a port in communication with the port of the peripheral. The controller may be configured to use the voltage measurement subsystem to detect when power being supplied from the second USB port of the server drops below a predetermined threshold, and to cause the power storage component to apply power to the port of the peripheral to power the peripheral.

In still another aspect the present disclosure relates to a method for monitoring and providing backup power to a peripheral which is communicating with, and receiving primary power from, a first communications port of a server. The method may comprise monitoring power being output from a second communications port of the server, where the first and second communications ports of the server are providing the same power output. The method may further involve using a controller and a voltage monitoring subsystem to detect when power being output from the second communications port of the server drops below a predefined threshold level. When the power being output from the server's communications ports drops below the predefined threshold, the controller may be used to control a power storage component to apply backup power to the peripheral.

BRIEF DESCRIPTION OF THE DRAWINGS

The drawings described herein are for illustration purposes only and are not intended to limit the scope of the present disclosure in any way.

DETAILED DESCRIPTION

Figure 1:
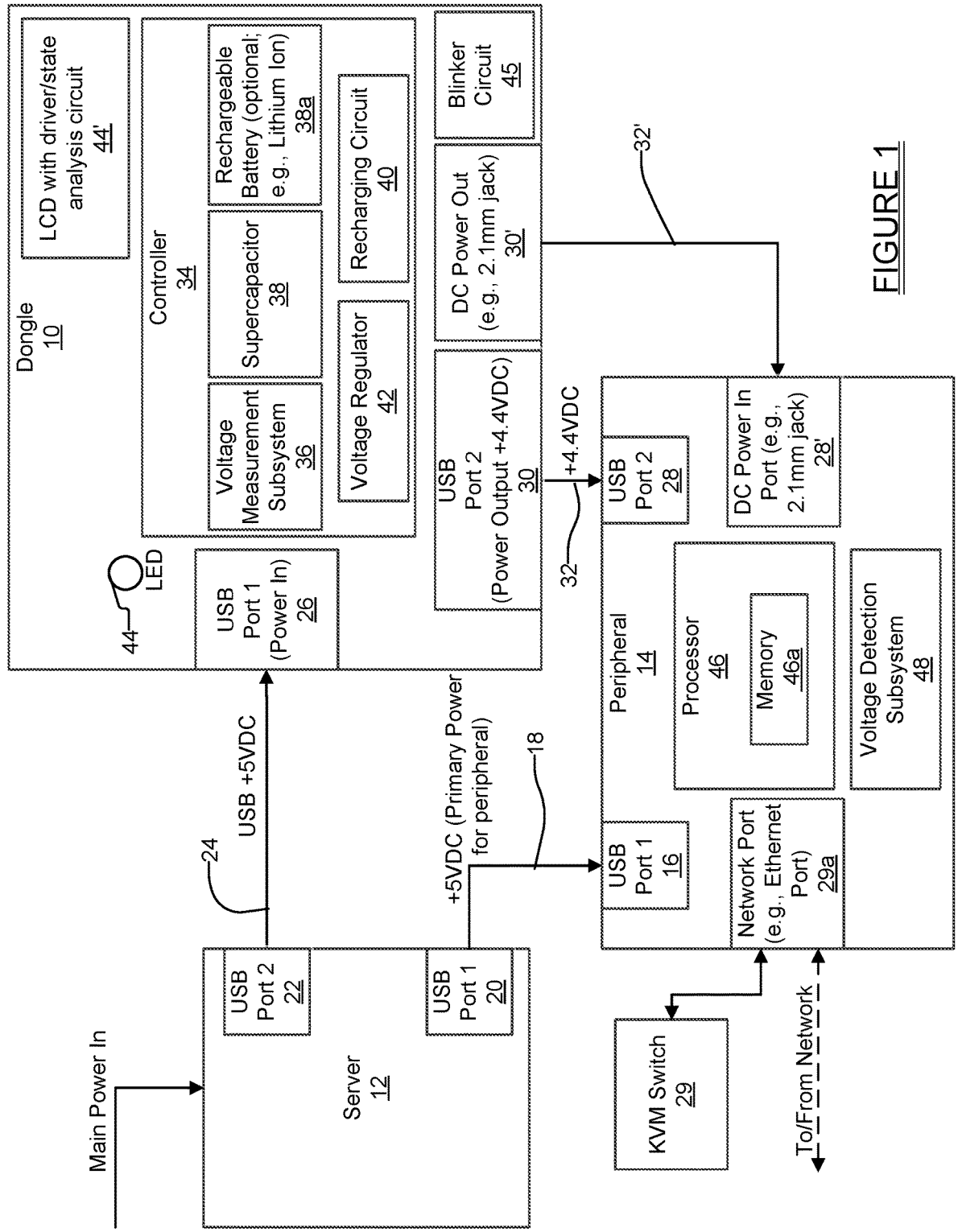
FIG. 1 is a high level block diagram of a dongle in accordance with one embodiment of the present disclosure coupled to a server and a peripheral, and configured to automatically provide emergency power to the peripheral in the event power from the server to the peripheral is temporarily lost.

The following description is merely exemplary in nature and is not intended to limit the present disclosure, application, or uses. It should be understood that throughout the drawings, corresponding reference numerals indicate like or corresponding parts and features.

Referring to FIG. 1 there is shown an apparatus 10 which is able to sense a loss of power from a server 12 which is supplying a peripheral 14 with DC power. In this example, for convenience the apparatus 10 will be referred to throughout the following discussion as a "dongle", although it will be appreciated that the apparatus 10 could take other forms besides a dongle. For example, the dongle 10 could be implemented as a box or even encased in a portion of a cable. Still further, the dongle 10 could be implemented as a subsystem within the form factor or housing of the peripheral 14.

The peripheral 14 may have a first communications port, which in this example is a first USB (Universal Serial Bus) port 16 which is connected via a USB cable 18 to a first USB port 20 of the server 12. The peripheral 14 is therefore able to communicate bidirectionally with the server 12 via the USB connection provided by USB cable 18, as well as to receive DC power from the server. The server 12 also has a second communications port, in this example a second USB port 22, which is coupled via a USB cable 24 to a first USB port 26 of the dongle 10. A second communications port of the peripheral 14, which in this example is a second USB port 28, is coupled to a second USB port 30 of the dongle 10 via a USB cable 32. Alternatively, a DC power output port (e.g., a 2.1 mm jack) 30' could be used instead to provide the DC output power from the dongle 10 to a DC power input port 28' of the peripheral 14 via a suitable cable 32'. Still further, the dongle 10 could be configured with both the second USB port 30 and the DC power output port 30', thus expanding the capability of the dongle 10 to accommodate situations where the peripheral 14 does not have a second USB port but does have a DC power input port.

The above described connection configuration enables the peripheral 14 to receive +5 VDC from the first USB port 20 of the server 12 while communicating with the server, which provides operating power to the peripheral. Simultaneously, the dongle 10 receives +5 VDC from the second USB port 22 of the server 12. The dongle 10 generates a predetermined minimum backup voltage, for example +4.4 VDC, which may be applied via the second USB port 30 and the USB cable 32 to the peripheral's second USB port 28 (or alternatively via the DC power output jack 30' and the cable 32' to the peripheral's 14 DC power input port 28' via cable 32'). This is highly useful for those instances where the server 12 loses power temporarily or needs to be rebooted. Such events would result in a momentary loss of power to the peripheral 14, which could have negative consequences such as a loss of communication with network connected KVM hardware or software, for example a KVM switch 29 which is in communication with a network port 29a of the peripheral. Another negative consequence would be if the peripheral 14 is running an operating system (OS) that takes time to boot when initially powered on. If power is lost to the peripheral 14, the result is a loss of access to a newly powered server for some amount of time until the peripheral 14 can fully boot up and provide access to network connected KVM hardware or software. It will also be appreciated that while the above described communications ports are described as being USB ports, that the dongle 10 is not necessarily limited to use with only USB ports. The dongle 10 may be used with little or no modification with any type of communications port that supplies DC power to the peripheral. However, USB ports are ubiquitous with modern day data center components and it is expected that the majority of different types of peripherals that the dongle 10 may be used with will be connected to other computing devices via a USB connection.

Referring further to FIG. 1, the dongle 10 may also include a controller 34, a voltage measurement subsystem 36, a power storage component in the form of a supercapacitor 38, a recharging circuit 40, and a voltage regulator 42. In place of, or in addition to, the supercapacitor 38, an optional rechargeable battery (e.g., Lithium Ion) 38a may be incorporated. While components 36-42 are shown as being part of the controller 34, it will be appreciated that these could be provided as fully independent subsystems that communicate with the controller 34 via one or more suitable busses. The voltage measurement subsystem 36 may be used to measure and monitor, in real time, the value of the DC voltage signal (i.e., the "Power In" signal) being received at the first USB port 26 of the dongle 10. The controller 34 uses the value of the DC input voltage to determine if the server 12 is providing the +5 VDC output from the server's two USB ports 20 and 22, therefore operating as expected, or if the +5 VDC outputs from the server's USB ports 20 and 22 have been interrupted or have dropped below a preset voltage threshold. When this occurs, the controller 34 determines that power to the peripheral 14 has been interrupted and enables power from the supercapacitor 38 (or alternatively the rechargeable battery 38a) to be applied to the second USB port 30 (or alternatively the DC power out port 30') to power the peripheral 14. Once the +5 VDC voltage signal is again detected as being received at the first USB port 26 of the dongle 10, the controller 34 may interrupt the DC power being provided to the second USB port 30 (or alternatively to the DC power out port 30') and may control the recharging circuit 40 to begin re-charging the supercapacitor 38 (and/or rechargeable battery 38a) until the supercapacitor (and/or rechargeable battery 38a) is fully recharged. In this manner the supercapacitor 38, and optionally the rechargeable battery 38a, may be maintained in a fully charged condition when not being used to provide backup power to the peripheral 14. When needed, however, the dongle 10 is always ready and available to provide the needed +4.4 VDC voltage at the second USB port 30 (or alternatively the DC power out port 30') to power the peripheral 14.

If the rechargeable battery 38a is incorporated in addition to the supercapacitor 38, it is also possible that the controller 34 could be programmed to first apply power from one or the other of the capacitor and rechargeable battery, and when the power level being provided by that component drops below a predefined threshold, to begin applying power from the other one of these two components. If both are incorporated, then recharging may be first performed on one of these two components, or recharging could be performed simultaneously on both components.

A Light Emitting Diode (LED) 44 may be provided on the dongle 10 to indicate its present state through one or more distinct illumination patterns. For example, when the supercapacitor 38 (or rechargeable battery 38a) is fully charged the LED may be illuminated continuously. When the supercapacitor 38 (or rechargeable battery 38a) is discharging the LED 44 may be powered on and off in a blinking pattern at a first repetition rate. When the supercapacitor 38 (or rechargeable battery 38a) is charging the LED 44 may be turned on and off at a second repetition rate which is greater or less than the first repetition rate. Alternatively, the same repetition rate may be used to indicate both a charging state and a discharging state for the supercapacitor 38 (and/or rechargeable battery 38a). Still further, a plurality of LEDs could be used to indicate the fully charged, charging and discharging states, or two or more different colored LEDs could be used to indicate these conditions. The dongle 10 is therefore not limited to any one particular configuration of LED 44 or LEDs. The dongle 10 could also use some other method of state indication other than an LED. For example, the dongle 10 could have a liquid crystal display (LCD) 44', as shown in FIG. 1, which includes a driver/state analysis circuit. The LCD 44' may be used to show the current charge level and the discharge and/or the charge status of the supercapacitor 38 (and/or rechargeable battery 38a). For the purpose of the following discussion, however, it will be assumed that the LED 44 is incorporated. The dongle 10 may also include a blinker circuit 45 for controlling a flashing pattern for the LED 44. The blinker circuit 45 may provide more than one flashing pattern or sequence for the LED 44 if a desire exists to uniquely identify the charging and discharging states of the supercapacitor 38 (and/or rechargeable battery 38a). The blinker circuit 45 may include suitable logic in the event more than one LED is provided so that different LEDs can be illuminated and/or controlled with different flashing rates or flashing sequences. If the LCD 44' with a driver/state analysis circuit is used instead of the LED 44, the state analysis circuit associated with the LCD would monitor the fullness of supercapacitor 38 (and/or rechargeable battery 38a) and would also monitor the charge and discharge state of supercapacitor 38 and/or rechargeable battery 38a, and display the results on an LCD display panel of the LCD 44'. Still further, if both the supercapacitor 38 and rechargeable battery 38a are being used, then either the LED 44, or a plurality of LEDs, or the LCD 44' may be used to provide an indication as to which one of these two power sources is being used at any given time to supply power to the peripheral 14.

The peripheral 14 in this example is an intelligent device, for example a UMIQ interface pod commercially available from the assignee of the present disclosure. This form of peripheral 14 is typically used with a keyboard, video and mouse (KVM) appliance to enable communications between the server 12 and a network. Accordingly, the peripheral 14 in this example includes its own processor 46 having an internal memory 46a, and a voltage detection subsystem 48. The voltage detection subsystem 48 may be used to determine when the DC voltage output signal from the server's first USB port 20 has dropped to about +4.4 VDC to about +4.5 VDC. The use of a backup voltage from the dongle 10 (e.g., +4.4 VDC) which is slightly different from the +5 VDC normally received from the server 12 is an important feature because it enables the peripheral processor 46 to identify when the full +5 VDC output power from the server's 12 first USB port 20 is no longer being received. The voltage detection subsystem 48 continuously monitors the voltage that is being received by the peripheral 14 and, when the received voltage drops to about +4.4 VDC-+4.5 VDC, provides a signal to the processor 46. When the processor 46 detects this condition, which signifies either a temporary reduction or a complete loss of power from the server's first USB port 20, the processor 46 may be programmed to enter a "Power Save" mode. In the Power Save mode, non-essential processing operations may be suspended by the processor 46. This extends the time that the peripheral 14 can be powered by the dongle's supercapacitor 38.

From the +4.4 VDC to +4.5 VDC threshold mentioned above, it will be appreciated that the low voltage threshold that the peripheral 14 looks for may be slightly different from the +4.4 VDC output that the dongle 10 provides. Accordingly, it is possible that the peripheral 14 could be programmed so that its processor 46 enters the Power Save mode even before the voltage output from the server 12 drops to +4.4 VDC and the dongle 10 begins supplying power to the peripheral 14. For example, the Power Save mode could be entered when voltage to the peripheral 14 is detected as having dropped to +4.7 VDC. But in any event, as soon as the server's 12 output voltage is detected by the dongle 10 as having dropped to the +4.4 VDC-+4.5 VDC range, the dongle will begin supplying a +4.4 VDC output to the peripheral 14. This output is regulated by the voltage regulator 42. The voltage regulator 42 may also regulate current applied to the supercapacitor 38 and/or the rechargeable battery 38a during a recharging operation.

It is also possible that the peripheral 14 may form a device without the capability to detect when it begins receiving a reduced DC power output signal (e.g., less than +5 VDC) from the server's first USB port 20. This may eliminate the ability to implement the Power Save mode of operation, but the peripheral 14 could nevertheless be maintained in a powered-up state by the dongle 10 in the event of a loss of primary power from the server 12. The dongle 10 still has the ability to immediately recognize that +5 VDC power has been lost from the server 12 through its voltage measurement subsystem 36, which is monitoring the DC power received at the dongle's first USB port 26. This enables the dongle's controller 34 to begin applying backup power to the peripheral 14, as well as to begin a recharging operation to recharge the supercapacitor 38 (and/or rechargeable battery 38a) as soon as the dongle 10 detects that power from the server 12 to the peripheral 14 has been restored (i.e., via detection of a full +5 VDC being present on the dongle's first USB port 26). In other words, the operations provided by the dongle 10, such as being able to detect the loss of the +5 VDC output voltage from the server 12, the automatic application of backup power to the peripheral 14, the automatic detection of when the +5 VDC output power from the server 12 is restored to the peripheral 14, and the automatic recharging of the supercapacitor 38 and/or rechargeable battery 38a, all may still be performed by the dongle 10 regardless of whether an "intelligent" peripheral or a "non-intelligent" peripheral is being used.

Figure 2:
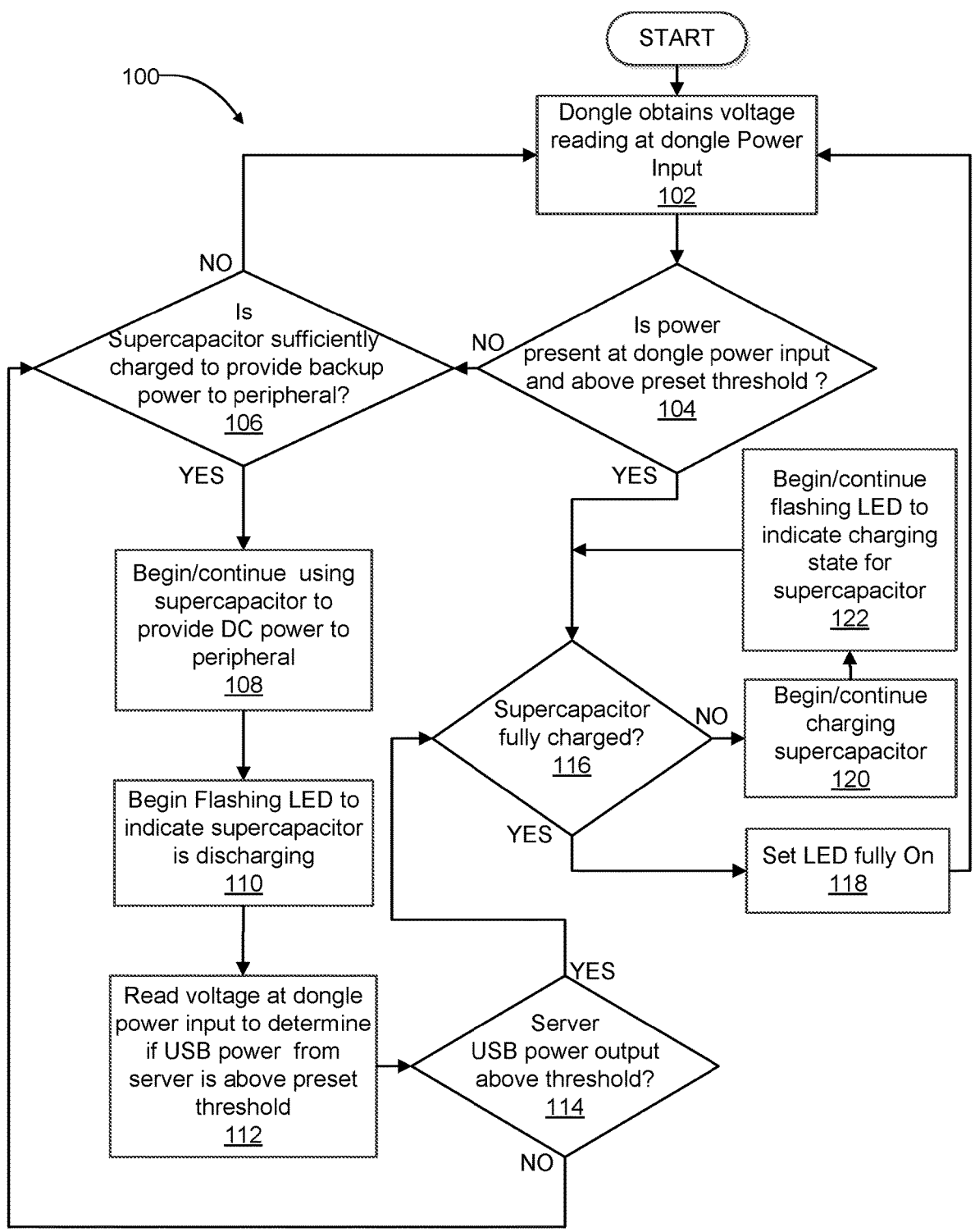
FIG. 2 is a flowchart illustrating various operations that may be performed by the dongle in monitoring power being received from the server and automatically providing emergency backup power to the peripheral when primary power via the USB connection between the peripheral and the server is lost.

Referring to FIG. 2, a flowchart 100 is shown illustrating various operations that may be performed by the dongle 10 in providing backup power to the peripheral 14. For this example it will be assumed that only the supercapacitor 38 is being used, with it being understood that the rechargeable battery 38a could be used in place of the supercapacitor without the need for altering any of the operations explained in FIG. 2.

At operation 102 the dongle 10 may obtain a voltage reading at the dongle's power input (i.e., first USB port 26). At operation 104 the controller 34 of the dongle 10 may determine if power is present at its power input, and/or whether the power being received is above a preset minimum threshold (e.g., above about +4.4 VDC to +4.5 VDC).

If the inquiry at operation 104 produces a "No" answer, then the dongle 10 may check if its supercapacitor 38 is sufficiently charged to provide backup power to the peripheral, as indicated at operation 106. If this inquiry produces a "No" answer, then operations 102 and 104 may be repeated. If the inquiry at operation 106 produces a "Yes" answer, however, then the dongle 10 may begin applying the stored charge of the supercapacitor 38 to its second USB port 30 (i.e., its output port) to begin powering the peripheral 14 with a 4.4 VDC output, as indicated at operation 108. The controller 34 may then use the blinker circuit 45 to cause the LED 44 to begin flashing to indicate that the dongle 10 is providing backup power to the peripheral 14, as indicated at operation 110. If the LCD 44' with its driver/state analysis circuit is used in place of the LED 44, then the LCD panel of the LCD 44' may begin displaying a remaining charge level for the supercapacitor 38.

At operation 112 the dongle controller 34 again reads the voltage at the dongle power input (i.e., first USB port 26), as indicated at operation 112, and then uses this measurement to determine if USB power from the server 12 is above the preset voltage threshold (e.g., +4.4 VDC to about +4.5 VDC), as indicated at operation 114. If the inquiry at operation 114 produces a "No" answer, then operations 106-114 may be repeated.

If the inquiry at operation 114 produces a "Yes" answer, indicating to the controller 34 that the server's 12 power output has risen above the preset voltage threshold, then at operation 116 the controller 34 makes a check to determine if the supercapacitor 38 is fully charged. If this check indicates that the supercapacitor 38 is fully charged then the controller 34 uses the blinker circuit 45 to set the illumination of the LED 44 to a continuously "On" condition, and then may re-perform operation 102. If the LCD 44' is being used instead of the LED 44, then the LCD display panel of the LCD 44' may display the current charging status of the supercapacitor 38 (e.g., "100% charged").

If the inquiry at operation 116 produces a "No" answer, indicating that the supercapacitor 38 is not fully charged, then at operation 120 the controller 34 controls the recharging circuit 40 to begin applying a recharging current to the supercapacitor. At operation 122 the controller 34 may control the blinker circuit 45 to begin a flashing sequence for the LED 44 that indicates that the supercapacitor 38 is being recharged. If the LCD 44' is being used instead of the LED 44, then the LCD display panel associated with the LCD 44' may display the current charge level of the supercapacitor 38 (e.g., "85% charged"). Operation 116 may then be re-performed to enable the controller 34 to monitor the charging of the supercapacitor 38 and to determine when the supercapacitor is fully recharged. If the inquiry at operation 116 produces a "Yes" answer, indicating that the supercapacitor 38 is fully charged, then at operation 118 the controller 34 may control the blinker circuit 45 to set the LED 44 to a fully "on" state. Alternatively, if the LCD 44' is being used, then the LCD display panel of the LCD 44' may display a message indicating that the supercapacitor 38 is fully charged.

The dongle 10 thus provides a means for monitoring the power available from a server's USB port, where the server is powering a peripheral, and detecting in real time when power drops below a preset level or is lost completely. The dongle 10 is able to virtually immediately begin applying power to the peripheral without any request or signal from the peripheral. The uninterrupted supply of power to the peripheral is important in many applications such as where the peripheral is helping to perform a KVM session or otherwise communicating with a network. If the peripheral is a "smart" peripheral with a built-in "Power Save" mode of operation, then the ability to run the peripheral at a reduced utilization while the peripheral is being powered by the dongle 10 also exists.

The dongle 10 of the present disclosure allows a backup power feature to be provided to the peripheral 14 without requiring any modifications to the peripheral, and without burdening the peripheral's processor with any additional processing operations. The dongle 10 essentially operates in a manner that is "transparent" to the peripheral until the server stops 12 providing power to the peripheral, at which time the dongle 10 operates independently to detect this condition and to automatically begin applying backup power to the peripheral 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A backup power system adapted to be coupled in between a server and an independant, a remotely located peripheral, the system comprising:
   a first communications port in communication with the server, the server including first and second ports, the first communications port of the system being in communication with the second port of the server and receiving power from the second port of the server, and where the server's first and second ports generate the same power output;
   a second communications port in communication with the independent, remotely located peripheral via a detachable cable, the peripheral further being adapted to be powered by a separate connection to the first port of the server;
   a controller for detecting when power being provided by the server through the server's second port, and received via the first communications port of the system, has dropped below a threshold level; and
   a power storage component responsive to the controller for supplying power to the peripheral, via the second communications port of the system, when the power being provided from the server's second port drops below the threshold level.

2. The system of claim 1, wherein the controller is configured to determine when power being received from the server has risen above the threshold level, and to remove power from the power storage component when the power being output from the first and second ports of the server rises above the threshold level.

3. The system of claim 1, further comprising a voltage regulator for regulating the power provided by the power storage component.

4. The system of claim 1, wherein the power storage component comprises a supercapacitor.

5. The system of claim 1, wherein the power storage component comprises a rechargeable battery.

6. The system of claim 1, wherein the controller comprises a voltage measurement subsystem for monitoring a voltage output from the server's second port.

7. The system of claim 1, wherein the controller further comprises a voltage regulator for regulating power being supplied to the peripheral by the system.

8. The system of claim 1, wherein the first and second ports of the server comprise universal serial bus (USB) ports, and wherein the first communications port of the system comprises a USB port.

9. The system of claim 8, wherein the second communications port of the system comprises a USB port.

10. The system of claim 1, wherein the second communications port comprises a DC power out port.

11. The system of claim 1, further comprising a display component for displaying an operating status of the system.

12. The system of claim 11, wherein the display component comprises at least one light emitting diode (LED).

13. The system of claim 12, further comprising a blinker circuit for controlling operation of the LED.

14. The system of claim 11, wherein the display component comprises a liquid crystal display (LCD).

15. The system of claim 1, wherein:
the first and second ports of the server comprise universal serial bus (USB) ports;
the first and second communications ports of the system comprise USB ports; and
the peripheral includes first and second ports which each comprise USB ports.

16. An independently, self-contained backup power system adapted to be coupled in communication between a server and a peripheral, wherein the peripheral has a first USB port coupled to a first USB port of the server, and the backup power system has a first USB port adapted to adapted to be coupled with a second universal serial bus (USB) port of the server, and the peripheral has an additional port able to receive power, the system comprising:
a controller;
a voltage measurement subsystem for monitoring power received from the second USB port of the server;
a power storage component;
an additional port in communication with the additional port of the peripheral; and
the controller configured to use the voltage measurement subsystem to detect when power being supplied from the second USB port of the server, and being received on the first USB port of the system, drops below a predetermined threshold, and to cause the power storage component to apply power via the additional port of the system to the additional port of the peripheral to power the peripheral.

17. The system of claim 16, wherein the additional port of the system comprises a second USB port, and the additional port of the peripheral comprises a second USB port.

18. The system of claim 16, wherein the additional port of the system comprises a DC power output port, and the additional port on the peripheral comprises a DC Power In port.

19. A method for monitoring and providing backup power from a backup power system to a peripheral which is communicating with, and receiving primary power from, a first communications port of a server, the method comprising:
using a cable to detachably couple the backup power system to the peripheral;
monitoring power being output from a second communications port of the server and received by the backup power system, where the first and second communications ports of the server are providing the same power output;
using a controller and a voltage monitoring subsystem of the backup power system to detect when power being output from the second communications port of the server drops below a predefined threshold level; and
when the power being output from the server's communications ports drops below the predefined threshold, using the controller to control a power storage component to apply backup power from the backup power system via the cable to the peripheral.

20. The method of claim 19, wherein using the controller to control a power storage component comprises using the controller to control a supercapacitor to cause the supercapacitor to apply the backup power to the peripheral.

\* \* \* \* \*